(12) United States Patent
Guest

(10) Patent No.: US 9,261,214 B2
(45) Date of Patent: Feb. 16, 2016

(54) TUBE COUPLING HAVING AN IMPROVED COLLET ALIGNMENT

(75) Inventor: Timothy Steven Guest, Bray (GB)

(73) Assignee: John Guest International Limited, West Drayton (GB)

(*) Notice: Subject to any disclaimer, the term of this patent is extended or adjusted under 35 U.S.C. 154(b) by 462 days.

(21) Appl. No.: 13/163,505

(22) Filed: Jun. 17, 2011

(65) Prior Publication Data

US 2011/0309614 A1    Dec. 22, 2011

(30) Foreign Application Priority Data

Jun. 22, 2010  (GB) .................................. 1010501.3

(51) Int. Cl.
*F16L 37/00* (2006.01)
*F16L 37/092* (2006.01)

(52) U.S. Cl.
CPC ................................ *F16L 37/0925* (2013.01)

(58) Field of Classification Search
CPC .................................................. F16L 37/0925
USPC ...................................... 285/27, 39, 319, 323
See application file for complete search history.

(56) References Cited

U.S. PATENT DOCUMENTS

| | | |
|---|---|---|
| 2,004,967 A | 6/1935 | Williams |
| 4,005,883 A | 2/1977 | Guest |
| 4,440,424 A * | 4/1984 | Mode ............................. 285/39 |
| 4,573,716 A | 3/1986 | Guest |
| 4,606,783 A | 8/1986 | Guest |
| 4,632,437 A | 12/1986 | Robson et al. |
| 4,637,636 A | 1/1987 | Guest |
| 4,650,529 A | 3/1987 | Guest |
| 4,654,246 A | 3/1987 | Provost et al. |
| 4,657,286 A | 4/1987 | Guest |
| 4,722,560 A | 2/1988 | Guest |
| 4,804,213 A | 2/1989 | Guest |
| 4,923,220 A | 5/1990 | Guest |
| 4,946,213 A | 8/1990 | Guest |
| 4,948,176 A * | 8/1990 | Bartholomew ................. 285/93 |
| 4,958,858 A | 9/1990 | Guest |
| 5,370,423 A | 12/1994 | Guest |
| 5,390,969 A | 2/1995 | Guest |

(Continued)

FOREIGN PATENT DOCUMENTS

| | | |
|---|---|---|
| EP | 1 258 666 A1 | 11/2002 |
| EP | 1 359 363 A2 | 11/2003 |

(Continued)

OTHER PUBLICATIONS 1010501.3, Oct. 15, 2010, Search Report.

*Primary Examiner* — David E Bochna
*Assistant Examiner* — James Linford
(74) *Attorney, Agent, or Firm* — Workman Nydegger

(57) ABSTRACT

A tube coupling includes a body (1) to receive a tube (22). The body has lateral recesses (12) extending outwardly from an internal wall. An O-ring (3) is retained by the body distally of the recesses. A collet (5) includes a ring (6) and collet legs (7) to be received in the lateral recesses and having a tooth (8) facing the passageway. Proximal movement of the collet with respect to the body causes the fingers to deflect inwardly. A tube support (10) includes a ring (12) and has a key to align with the body. Castellations (13, 14) extend proximately from the tube support ring and are complementary to the collet legs to align the collet with respect to the body as the collet is inserted into the body.

17 Claims, 5 Drawing Sheets

(56) References Cited

U.S. PATENT DOCUMENTS

| | | |
|---|---|---|
| 5,401,064 A | 3/1995 | Guest |
| 5,443,289 A | 8/1995 | Guest |
| 5,468,027 A | 11/1995 | Guest |
| 5,607,190 A | 3/1997 | Exandier et al. |
| 5,607,193 A | 3/1997 | Guest |
| 5,683,121 A | 11/1997 | Guest |
| 5,738,387 A | 4/1998 | Guest |
| 5,775,742 A | 7/1998 | Guest |
| 5,779,284 A | 7/1998 | Guest |
| 5,915,738 A | 6/1999 | Guest |
| 6,056,326 A | 5/2000 | Guest |
| 6,173,999 B1 | 1/2001 | Guest |
| 6,283,443 B1 | 9/2001 | Taneya |
| 6,439,620 B1 | 8/2002 | Guest |
| 6,467,816 B1 | 10/2002 | Huang |
| 6,557,904 B2 | 5/2003 | Naito |
| 6,863,314 B2 | 3/2005 | Guest |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,032,932 B2 | 4/2006 | Guest |
| 7,082,957 B2 | 8/2006 | Guest |
| 7,100,948 B2 | 9/2006 | Guest |
| 7,543,858 B1 | 6/2009 | Wang |
| 7,658,420 B2 | 2/2010 | Harger et al. |
| 7,758,085 B2 | 7/2010 | Guest |
| 7,857,361 B1 | 12/2010 | Hanser et al. |
| 2002/0109353 A1 | 8/2002 | Guest |
| 2003/0116960 A1* | 6/2003 | Yates ............................ 285/39 |
| 2003/0201641 A1 | 10/2003 | Guest |
| 2005/0006896 A1 | 1/2005 | Naito et al. |
| 2006/0181080 A1 | 8/2006 | Guest |
| 2006/0202478 A1 | 9/2006 | Guest |
| 2007/0034255 A1 | 2/2007 | Guest |
| 2007/0034817 A1 | 2/2007 | Guest |
| 2007/0194568 A1 | 8/2007 | Guest |
| 2007/0200344 A1 | 8/2007 | Guest |
| 2008/0136166 A1 | 6/2008 | Guest |
| 2008/0238087 A1* | 10/2008 | Wang et al. .................... 285/39 |
| 2009/0140514 A1 | 6/2009 | Guest |
| 2009/0295152 A1 | 12/2009 | Guest |
| 2010/0264644 A1* | 10/2010 | Shen et al. ..................... 285/24 |

FOREIGN PATENT DOCUMENTS

| | | |
|---|---|---|
| EP | 1 433 992 A1 | 6/2004 |
| GB | 1 520 742 | 8/1978 |
| GB | 2 301 158 A | 11/1996 |
| GB | 2 331 564 | 5/1999 |
| JP | 06-335141 | 12/1994 |
| WO | WO 90/08288 | 7/1990 |
| WO | WO 98/29679 | 7/1998 |
| WO | WO 2005/064220 | 7/2005 |

* cited by examiner

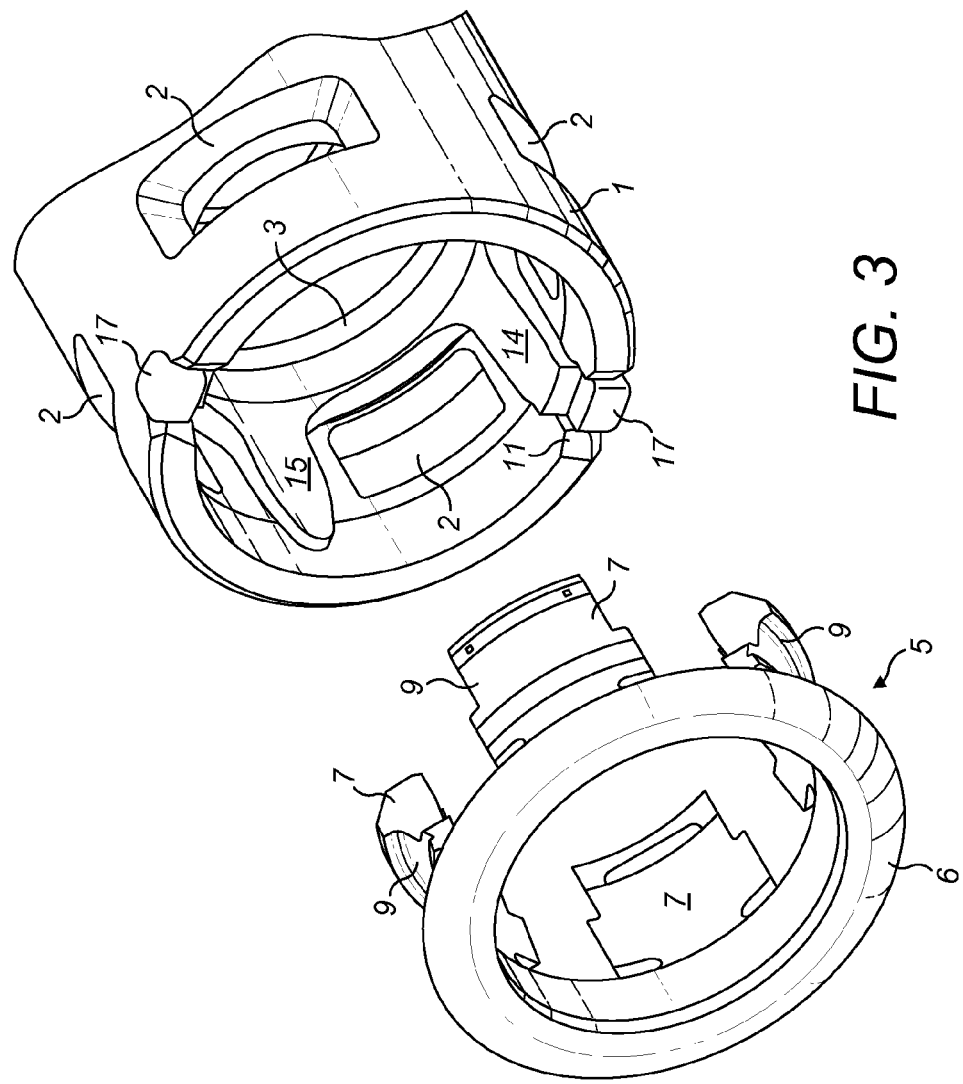

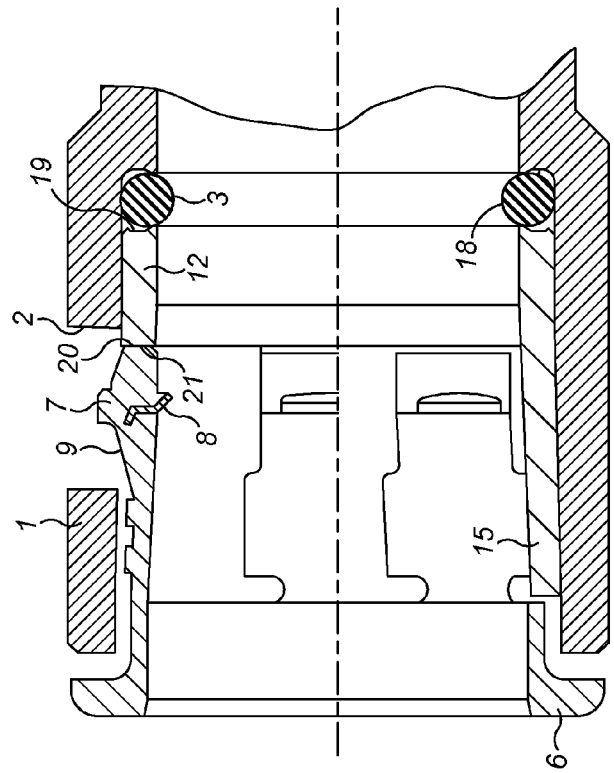
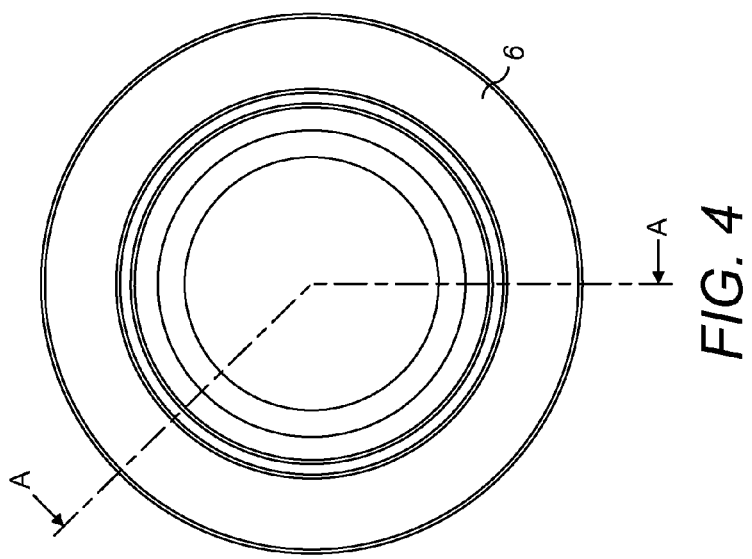

TUBE COUPLING HAVING AN IMPROVED COLLET ALIGNMENT

CROSS-REFERENCE TO RELATED APPLICATIONS

This application claims priority to United Kingdom Application No. 1010501.3, filed on Jun. 22, 2010, which application is hereby incorporated by reference.

BACKGROUND OF THE INVENTION

1. The Field of the Invention

The present invention relates to a tube coupling comprising a body having an open proximal end and a throughway to receive a tube, in use, the body having at least one lateral recess extending outwardly from an internal wall; an O-ring retained by the body distally of the or each recess and surrounding the throughway; a collet inserted into the proximal end of the body, the collet comprising a ring and at least one distally projecting collet leg, the or each collet leg being received in a respective lateral recess in the body and having a tooth facing the passageway, the body and leg being arranged such that proximal movement of the collet with respect to the body causes the or each finger to deflect inwardly. Such a coupling will subsequently be referred to as being "of the kind described".

2. The Relevant Technology

A tube coupling of the kind described is well-known in the art. One example of such a coupling is illustrated in FIG. 1, which represents a product sold by John Guest as part of the "Underground" range.

As illustrated in FIG. 1, the body 1 is of tubular construction and has lateral recesses provided by four windows 2. An O-ring 3 is placed into the body 1 and rests in a recess (not shown) which is beyond the windows 2. An optional spacer washer 4 is fitted in the body 1 between the O-ring 3 and the windows 2 and a collet 5 is pushed into the tubular body 1 to complete the assembly. The collet comprises a collet ring 6 and four distally projecting collet legs 7, each of which locates within a respective window 2.

As is well-known in the art, a tube is pushed into the coupling from the collet end through the throughway to a position beyond the O-ring 3. The O-ring then seals against the outer face of the tube. Pulling on the tube in the proximal direction causes teeth 8 on the collet legs 7 to bite into the tube such that the collet 5 is drawn proximally together with the tube. Cam surfaces 9 on the collet legs 7 co-operate with the proximal edges of respective windows 2 in order to deflect collet legs 7 inwardly to produce a clamping force on the tube which increases with the pulling force on the tube to provide a secure coupling.

In order to release the tube from the coupling, the collet 5 is pushed distally and held in that position so that the teeth 8 are disengaged from the tube which can then be readily withdrawn.

As is apparent from FIG. 1, in order to assemble the coupling, the O-ring 3, spacer washer 4 and collet 5 are sequentially inserted into the housing 1. The collet 5 must be correctly aligned so that the collet legs 7 line up with their respective windows 2. If the collet 5 is not inserted correctly, the legs 7 can be damaged in use, or the collet 5 could fall out.

The present invention is directed to an improvement of a tube coupling of the kind described which is designed so that it is impossible to insert the collet in an incorrect alignment.

SUMMARY OF THE INVENTION

According to the present invention, a tube coupling of the kind described is characterised by a tube support within the body, the tube support comprising a ring surrounding the throughway between the O-ring and the or each collet leg, the body and tube support being provided with complementary keys to align the tube support and body to enable insertion of the collet, and at least one castellation extending proximally from the tube support ring which is complementary to a respective collet leg to align the collet with respect to the body as the collet is inserted into the body.

By providing a tube support with at least one castellation which can correctly align the collet, insertion of a misaligned collet is prevented. The tube support is, of course, required to be correctly inserted so that the keys between the body and support correctly locate with respect to one another. However, if a tube support is not correctly located, then it is impossible to insert the collet into the housing. Thus, assembly with the tube support incorrectly aligned is impossible. Once the tube support is correctly aligned, it naturally follows that the collet must be correctly aligned owing to the or each castellation. The present invention therefore guarantees assembly with the components correctly aligned.

The complementary keys between the body and tube support can be provided adjacent to the tube support ring. However, preferably, the key on the tube support is provided at the proximal end of at least one castellation and the respective key on the body is preferably provided at the proximal end of the body. In particular, the key on the proximal end of at least one castellation is preferably a radially and axially outwardly extending projection and the respective key on the body is a groove on the proximal face of the body.

Such a construction allows the tube support to be readily dropped into the body in the correct orientation. Therefore, not only is the reliability of the assembly process improved for the reason set out above, but it is also simplified as the tube support is readily inserted in the correct orientation.

While one castellation is sufficient to provide the necessary alignment, there are preferably two or more castellations. The presence of two or more castellations provides support and alignment for the tube when it is being pushed into the coupling which will reduce the risk of the end of the tube damaging or dislodging the O-ring seal. The castellations also provide support of the tube during its service lifetime, particularly if the tube is subjected to a lateral load. If two castellations are provided, these will need to have a reasonably large circumferential dimension in order to provide the necessary support. Preferably, therefore, three or more castellations are provided.

Preferably the castellations diverge from one another towards the proximal end and the throughway in the body is dimensioned so as to deflect the castellations inwardly as the tube support is inserted into the body. This provides a tight interference fit between the tube support and body creating a stable sub-assembly during manufacture.

Preferably, the or each castellation tapers towards its proximal end. This provides a lead-in for the collet legs, thereby facilitating alignment of the collet and increasing productivity.

The distal face of the tube support ring is preferably profiled to support the O-ring during tube insertion. This assists with alignment of the tube support and provides further protection for the O-ring.

Preferably, the proximally facing surfaces of the tube support ring between castellations are configured to contact the distal ends of the collet legs when the collet is pushed distally into the body to a release position. This helps maintain the collet legs in alignment, thereby improving the release of the tube.

BRIEF DESCRIPTION OF THE DRAWINGS

An example of a coupling according to the present invention will now be described with reference to the accompanying drawings, in which:

FIG. 3 is a view similar to FIG. 2 showing the coupling partially assembled;

FIG. 4 is an end elevation of the coupling shown in FIGS. 2 and 3;

FIG. 4A is a cross-section through line A-A in FIG. 4; and

DETAILED DESCRIPTION OF THE PREFERRED EMBODIMENTS

Figure 1:
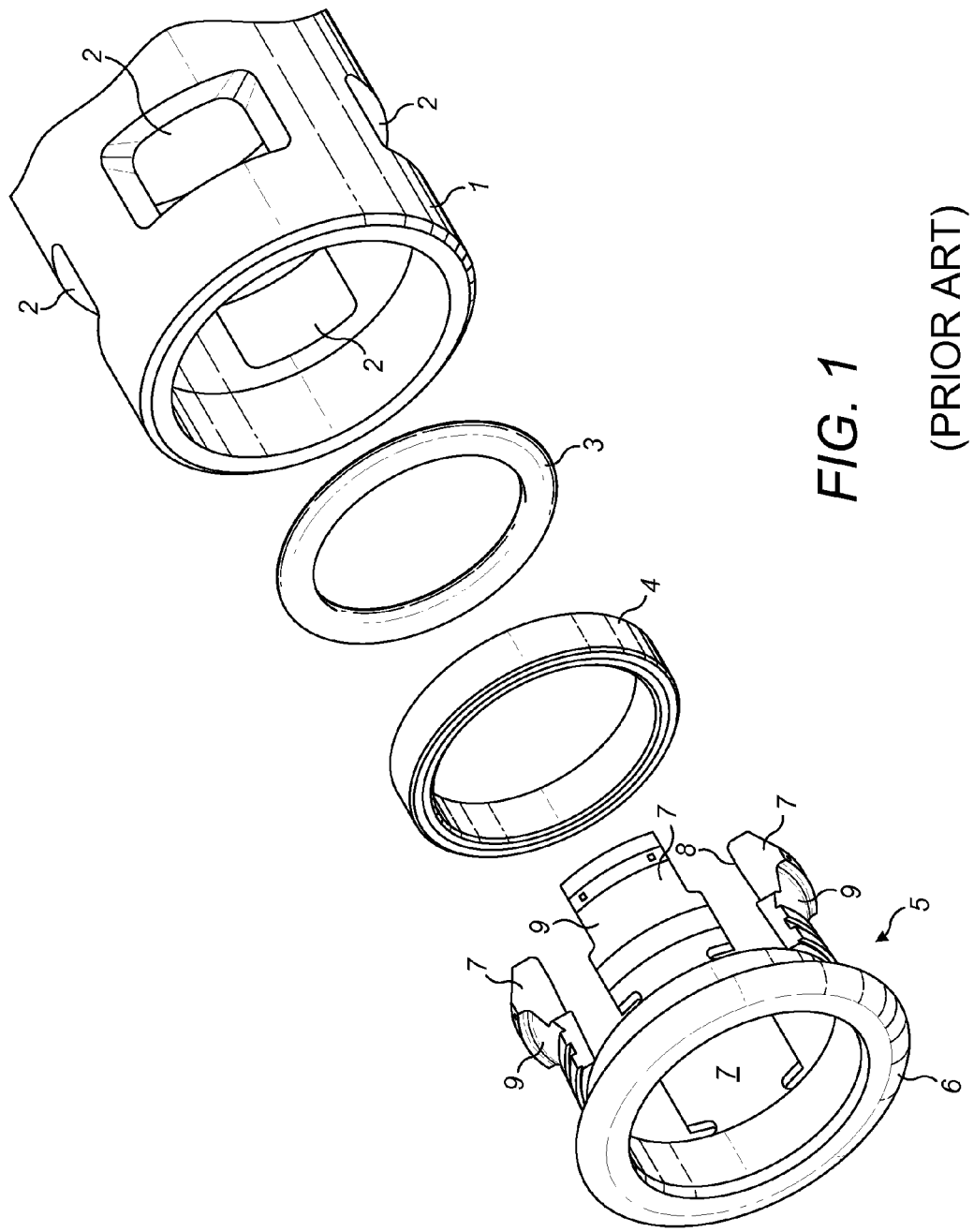
FIG. 1 is an exploded perspective view of a prior art coupling.
Figure 2:
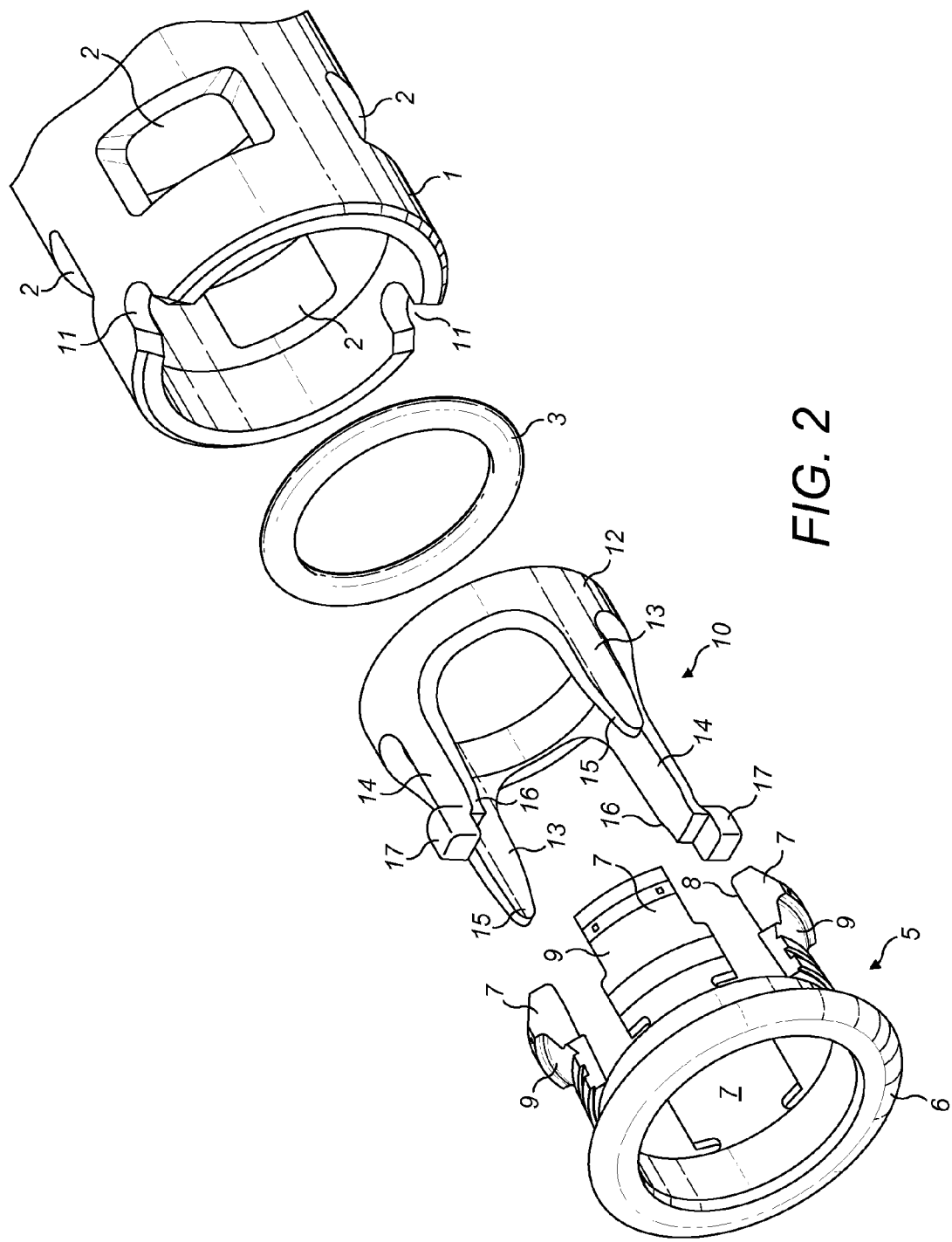
FIG. 2 is a view similar to FIG. 1 showing an example of the present invention.

The coupling is, in most respects, similar to the coupling described in FIG. 1 above and the description of this will not be duplicated here.

The same components have been represented with the same reference numerals where appropriate.

The main difference is that the spacer washer of FIG. 1 has now been replaced by a tube support 10 which will be described in greater detail below. The other difference is that a pair of notches 11 have been formed on the proximal face of the body 1 for reasons which will be described below.

The tube support 10 comprises a tube support ring 12 at the distal end. This may be a complete or a split ring. Projecting distally from the tube support ring 12 are a pair of first castellations 13 and a pair of second castellations 14 and it should be noted that the number and positioning of each type of castellation may be varied. The first pair of castellations are simple straight projections which have a taper 15 such that their circumferential dimension reduces towards the proximal end.

The second castellations 14 also have a slight taper 16 but also have, at their proximal end, a radially outwardly stepped projection 17. This projection 17 is sized and shaped to enter the corresponding groove 11 on the proximal face of the body 1 when the tube support is inserted into the body 1 as shown in FIG. 3.

In order to assemble the connector, the O-ring 3 is first inserted from the distal end of the body 1 and comes to rest on a concave ledge 18 within the body (see FIG. 4A). The tube support 10 is then inserted until its distal face 19, which is also profiled to support the O-ring 3 comes into contact with the O-ring. The tube support 10 is inserted in such an orientation that the projections 17 drop into the notches 11. It will be appreciated that it is easy to insert the tube support 10 in the correct orientation as the notches 11 and projections 17 are highly visible during the insertion process. Further, if the tube support 10 is inserted in the incorrect orientation, it cannot be fully inserted as the projections 17 will abut against the proximal face of the housing 1. As a consequence, the collet cannot be subsequently inserted as the tube support 10 obstructs the windows 2.

To complete the assembly, the collet 5 is then inserted with the legs 7 being guided by the castellations 13, 14 onto the correct orientation. The tapers 15, 16 correct any slight misalignment between the two components. The collet 5 may be designed such that it is only insertable in one unique orientation. However, in the present case, it has four identical legs such that it can be inserted in any one of four different orientations.

Upon insertion, the legs 7 are initially pushed inwards by the inner wall of the body 1 and then snap into place when they enter the windows 2. In the inserted position, the distal end 20 of each collect leg 7 abuts a proximal face 21 of the tube support ring 12 to provide additional stability to the collect. The castellations 13, 14 flare outwardly towards to the proximal end so that, upon insertion into the body 1, they are deflected inwardly against their own resilience, thereby providing the tight fit of the tube support within the body 1.

Figure 5:
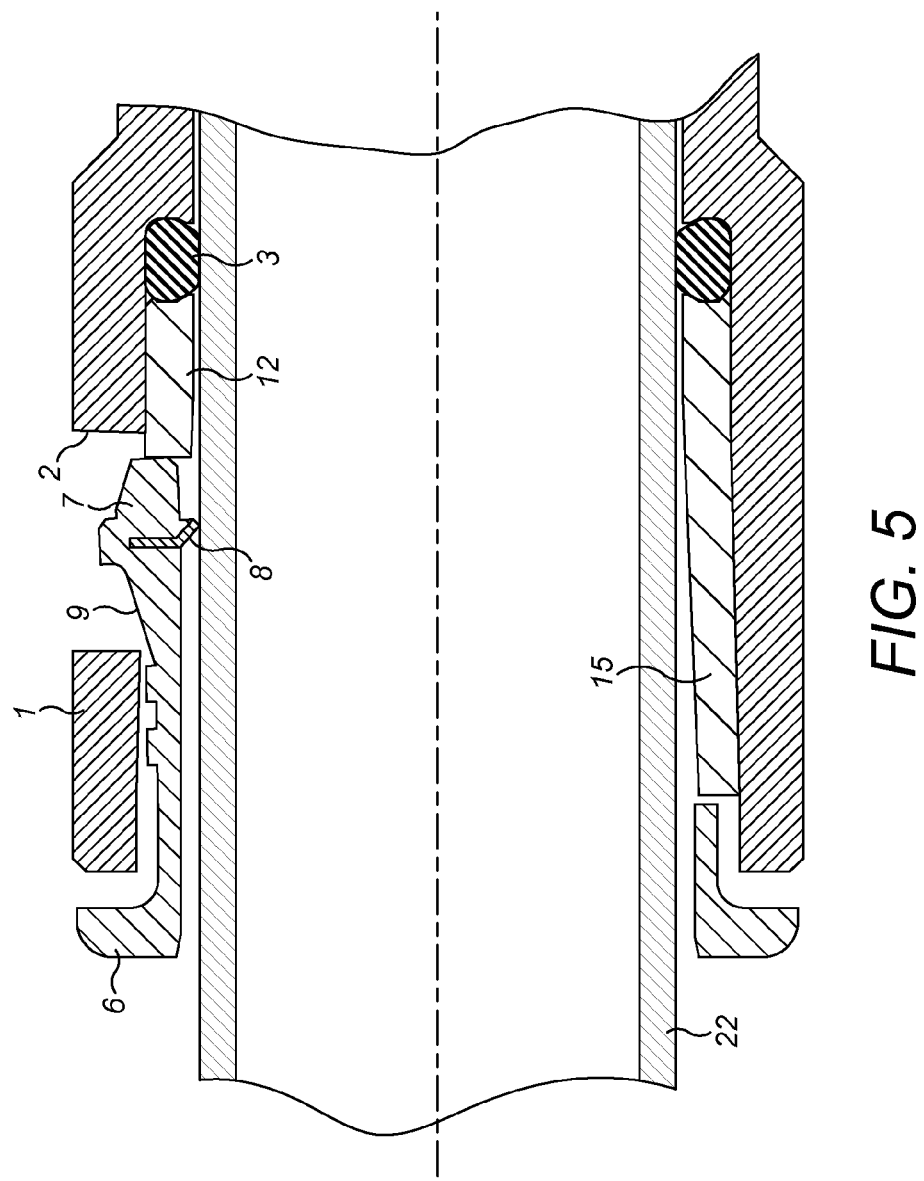
FIG. 5 is a view similar to FIG. 4A but with a tube inserted.

In use, a tube 22 is inserted from the proximal end to the position shown in FIG. 5. The tube support 10 provides protection to the O-ring seal 3 preventing it from being dislodged by insertion of the tube. Also, the castellations 14, 15 provide lateral support to the tube 22.

As is well-known in the art, insertion of the tube 22 deflects the legs 7 radially outwardly and compresses the O-ring 3 in order to provide a seal around the tube 22. Pulling the tube in the proximal direction causes the teeth 8 to bite into the wall of the tube 22 deflecting the leg 7 inwardly and increasing the clamping force. This provides a highly effective way of locking the tube 22 within the coupling 1. In order to release the tube 22, the collet ring 6 is pushed into the body 1 allowing the resilience of the legs 7 to disengage the teeth 8 from the tube 22. In the present case, this also has the effect of pushing the tube support distally against the O-ring seal 3. With the teeth 8 disengaged, the tube 22 is free to be removed from the connector 1.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube coupling for coupling with a tube, comprising:
    a body having an open proximal end and a throughway to receive the tube, the body having a plurality of radially spaced apart lateral recesses extending outwardly from the internal wall, each lateral recess comprising an opening extending through an internal wall;
    an O-ring retained by the body distally of the plurality of radially spaced apart lateral recesses and surrounding the throughway;
    a collet inserted into the proximal end of the body, the collet comprising a ring and at least one distally projecting collet leg, the at least one collet leg being received in at least one of the lateral recesses in the body and having a tooth facing the passageway, the body and the at least one collet leg being arranged such that proximal movement of the collet with respect to the body causes the at least one collet leg to deflect inwardly and such that the at least one collet leg is disposed between the O-ring and the ring of the collet; and
    a tube support at least partially disposed within the body, the tube support comprising a ring surrounding the throughway between the O-ring and the at least one collet leg, the body and tube support being provided with complementary keys to align the tube support relative to the body to enable insertion of the collet, and at least one castellation extending proximately from the tube support ring which is complementary to a respective collet leg to align the collet with respect to the body as the collet is inserted into the body.

2. The coupling according to claim 1, wherein the key on the tube support is provided at a proximal end of the at least one castellation and the respective key on the body is provided at the proximal end of the body.

3. The coupling according to claim 2, wherein the key on the proximal end of the at least one castellation is a radially and axially outwardly extending projection and the respective key on the body is a groove on the proximal end of the body, the projection being received within the groove.

4. The coupling according to claim 3, wherein the proximal end of the body terminates at a proximal end face, the groove on the body being formed on the proximal end face and the key on the at least on castellation being received within the groove.

5. The coupling according to claim 1, wherein the at least one castellation comprises two or more castellations.

6. The coupling according to claim 5, wherein the castellations diverge from one another towards the proximal end and the throughway in the body is dimensioned so as to deflect the castellations inwardly as the tube support is inserted into the body.

7. The coupling according to claim 5, wherein the tube support ring has proximally facing surfaces disposed between the castellations, the proximally facing surfaces contacting the distal ends of the collet legs when the collet is pushed distally into the body to a release position.

8. The coupling according to claim 1, wherein the at least one castellation comprises three or more castellations.

9. The coupling according to claim 8, wherein the castellations diverge from one another towards the proximal end and the throughway in the body is dimensioned so as to deflect the castellations inwardly as the tube support is inserted into the body.

10. The coupling according to claim 1, wherein the at least one castellation tapers towards its proximal end.

11. The coupling according to claim 1, wherein the distal face of the tube support ring is profiled to support the O-ring during tube insertion.

12. The coupling according to claim 1, wherein tube support comprises at least two castellations projecting from the ring and the at least one collet leg is received between the at least two castellations.

13. The coupling according to claim 1, wherein the ring of the tube support is located between the O-ring and the ring of the collet.

14. The coupling according to claim 1, wherein the at least one collet leg projecting from the ring of the collet terminates at a distal end face, the distal end face of the at least one leg of the collet contacting the ring of the tube support.

15. A tube coupling for coupling with a tube, comprising:
a body having an open proximal end and an internal wall that bounds a throughway to receive the tube, the body having a plurality of radially spaced apart lateral recesses extending outwardly from the internal wall, each lateral recess comprising an opening extending through the internal wall;
an O-ring disposed within the throughway of the body and retained by the body distally of the plurality of recesses, the O-ring surrounding the throughway;
a collet inserted into the proximal end of the body, the collet comprising a collet ring and a plurality of spaced apart collet legs projecting distally from the collet ring into the throughway toward the O-ring, each collet leg having an outside face with at least a portion thereof received within a corresponding one of the plurality of lateral recesses of the body and an inside face having a tooth projecting radially therefrom into the throughway; and
a tube support at least partially disposed within the throughway of the body, the tube support comprising:
a tube support ring disposed within the throughway between the O-ring and the collet; and
a plurality of spaced apart castellations extending proximally from the tube support ring, at least one of the castellations being disposed between a two of the plurality of collet legs.

16. The coupling according to claim 15, wherein the exterior surface of each collet leg comprises a sloped cam surface.

17. The coupling according to claim 15, further comprising:
a key projecting from one of the castellations; and
the proximal end of the body terminating at a proximal end face, an alignment groove being recessed on the proximal end face, the key being removably received within the groove.

* * * * *